Patented July 24, 1928.

1,678,454

UNITED STATES PATENT OFFICE.

THEODORE F. ZUCKER, OF NEW YORK, N. Y., ASSIGNOR, BY MESNE ASSIGNMENTS, TO UNIVERSITY PATENTS, INC., OF NEW YORK, N. Y., A CORPORATION OF NEW YORK.

PROCESS FOR OBTAINING CERTAIN REMEDIAL PRINCIPLES OF OILS.

No Drawing.   Application filed December 7, 1922.   Serial No. 605,513.

My invention relates to remedial products having antirachitic properties and refers particularly to a means for the production or reclamation of such products from cod liver oil and other oils.

It might be thought that, since cod liver oil is so very definitely a good remedy both prophylactic and curative for rickets, it would be of no particular interest to modify this substance. However, experience with cod liver oil shows up certain practical defects in the treatment. First of all, a certain proportion of children will not tolerate the ingestion as much as three teaspoonfuls of oil a day, the result being vomiting or digestive derangement with no benefits. In the second place, the administration of oil often proves to be connected with difficulties due to its bad taste and oily properties. Besides these factors, there are indications that a more intensive treatment, that is, the administration of the active substance in greater concentration than it occurs in the oil, would very often be an advantage. My experiments also show that it is possible to obtain the active material from the cheaper unrefined oils, which can then, after removing its medicinally valuable substance, be used in the industries, so that the cost of refining is saved and that of the oil itself minimized by its resale. It is evident, therefore, that the isolation of the antirachitic principles from cod liver oil will overcome the above-mentioned difficulties by simplifying the administration and in making a large number of cases amenable to treatment.

The excellent prophylactic and curative effects of cod liver oil in the treatment of rickets has long been recognized, but the scientific investigation of the disease is of recent origin, due to the fact that it is only within the past few years that it has been found possible to produce in animals a condition of bones similar to, or identical with, the conditions found to occur spontaneously in rachitic children.

The study of such rachitic animals has thrown much light upon the causative effects and the treatment of the disease.

The efficiency of cod liver oil has caused considerable investigation and speculation regarding this remedial agency and has resulted in the acceptance by some investigators that the effective principle is due to the presence of vitamines, and especially the fat soluble vitamine A.

Numerous experiments made by me upon rachitic animals disclose that this theory is untenable and that the antirachitic active principles is, in fact, devoid of all vitamines, and I have discovered a means whereby the actual antirachitic active principle of cod liver oil may be extracted and obtained therefrom.

I have found that the fatty acids and the cholesterol present in cod liver oil possesses no antirachitic properties and, therefore, must be removed from the active antirachitic principle in order that the latter may be obtained in a condition of greatest purity and strength.

This separation with the isolation of the active element has necessitated considerable study of the cod liver oil content and has required many experiments in an endeavor to obtain the desired antirachitic substance in such a condition of purity and strength as would present both economic advantages and increased medicinal values.

I have found that the antirachitic principle of cod liver oil may be separated from the non-antirachitic principles by extraction through the medium of a suitable solvent and that alcohol is particularly suitable for this purpose.

I have further found that the active substance may be extracted from the cod liver oil either by a cold alcoholic, or other solvent, treatment of the oil itself or a cold alcoholic, or other solvent, treatment of the oil after the fatty acids have been saponified therein, but for reasons of more easy manipulation and economy of time and expense, I prefer the method in which the cod liver oil is extracted by cold alcohol, or other solvent, prior to the saponification of the fatty acids, and will describe that process in more detail without, however, limiting myself to the particular method thus described.

The alcoholic extract of cod liver oil contains the active antirachitic principle, the fatty acids, cholesterol and such organic amines and bases that may be present. While some of these compounds may not be deleterious when present in the finally obtained antirachitic principle, it is advisable to free them, if possible, from the final result, in order that the latter may be as pure as desirable.

It is evident, therefore, that the alcoholic extract may be so treated as to eliminate the foreign matters soluble therein and especially the fatty acids which are present in considerable quantities.

I have found that when insoluble soaps of the fatty acids are produced in an aqueous solution, the precipitating soaps carry with them the antirachitic principle present at the time of precipitation, and that the latter can be readily extracted from these insoluble soaps, thus presenting a method of obtaining the antirachitic principle.

A consideration of the above stated facts indicates that there may be a wide variance in the operation of the intermediate steps between the alcohol extraction and the production of the final result, in that various methods may be employed for the saponification of the fatty acids, production of the insoluble soaps, extraction of the antirachitic principles and its purification, these differences being in both method of process and chemicals employed.

As an example of one form of the process of my invention, I give the following:—

Twenty gallons of cod liver oil are put into an emulsifying tank. Ten gallons of 95% ethyl alcohol are added and the mixture agitated for an hour and a half to two hours. It is then allowed to settle. The alcohol settles out as a top layer and is siphoned off. This process is repeated with three lots of five gallons of alcohol. This alcohol dissolves out of the cod liver oil the active antirachitic substance together with the free fatty acids of the cod liver oil and a small amount of cod liver oil itself. The alcohol extract is evaporated to about 500 c. c. and to this is added an equal volume of 40% aqueous sodium hydroxide. The sodium hydroxide forms sodium soap with the free fatty acids in the extract and also saponifies the unchanged cod liver oil which has gone into the alcohol. The action of the sodium hydroxide is complete in a few minutes. The soaps are put into solution with about ten liters of water. This gives a practically clear solution due to the fact that the sodium soap is capable of dissolving or holding in a very fine colloidal condition the unsaponifiable oily material which is present. Now add to the clear soap solution a concentrated solution of calcium chloride in water, until the precipitation of calcium soap is complete. This is usually indicated quite clearly by the precipitate becoming flocculent and settling out. Care must be taken to avoid an excess of calcium chloride. The solution must always remain definitely alkaline. The precipitated calcium soaps carry down with them the unsaponifiable material including the active substance, so that the aqueous solution is free from all oily material. The active substance goes down completely with the calcium soaps, which are filtered off on a Buechner funnel and sucked dry. The active substance is then dissolved out of the calcium soaps by means of repeated washing with 500 c. c. quantities of acetone and filtering off on a Buechner funnel. When the acetone extract becomes practically colorless, the extraction is complete. The acetone is now distilled off until the volume is reduced to about 400 c. c. At this stage the solution may become turbid due to the water taken up by the acetone. About 500 c. c. of ether are added. This will dissolve the active substance, and the ether solution can now be washed with diluted alkali to remove any traces of fatty acids or soaps that have gone into the extract. Usually two or three washings with 200 to 300 c. c. of 2% sodium hydroxide are sufficient. The ether solution is now washed with diluted hydrochloric acid in a similar manner to remove amines and other organic bases. The ether is then separated carefully in a separating funnel and put into a flask with sodium sulphate to dry the ether. When the ether has been thoroughly dried, it is distilled off leaving behind a waxy material of a light brown to dark brown color, which constitutes the active substance. This material is undoubtedly still a mixture of various components, a small amount of cholesterol always being present. It can be completely decolorized by boiling with charcoal in ether solution, but, on standing, the brown color returns in time.

Experiments upon rachitic rats have shown the antirachitic principle thus obtained to be 500 times as concentrated as the cod liver oil from which it was obtained.

As stated above, instead of directly extracting the cod liver oil with alcohol as described in the example, the cod liver oil may be first saponified and the resulting product extracted.

The following is a general description of the last-mentioned process:—

The cod liver oil is hydrolized with alcoholic sodium hydroxide, the saponified oils dissolved in water and extracted with ether to remove the unsaponified substances. The fatty acids are precipitated by acidification, resaponified and extracted with ether and, when produced in a pure state, show no antirachitic action. The ether extract is dissolved in alcohol and boiled with charcoal to decolorize it, and evaporated to crystallize out the cholesterol, the remainder containing the antirachitic principle.

The above process is rather cumbersome because of the extractive treatment of large quantities of aqueous soap solution, which difficulty is overcome to some extent by the following modification of my process:—

The cod liver oil is hydrolized with alcoholic sodium hydroxide and the saponified products dissolved in water and precipitated by the addition of calcium chloride solution, maintaining the solution alkaline. The precipitated calcium soap, including the antirachitic principle and cholesterol, are dried, extracted with alcohol and the dissolved cholesterol removed from the antirachitic substances by crystallization.

It is evident, therefore, that the particular steps of the process of my invention may be of a varied character without going beyond the scope of my invention.

In the foregoing, I have referred particularly to cod liver oil, but my invention is not limited to that particular oil, as my process is adapted to the production or reclamation of pharmacologically active products having as an attribute the property of preventing or curing rickets from other oils, among which I mention other fish liver oils, the so-called "fish oils" as menhaden oils and many vegetable oils containing these remedial products.

By the words "antirachitic principles", "active substance" and similar designations in my specification and claims, I mean those pharmacologically active products obtained from cod liver oil by my process and which have as an attribute the property of preventing or curing rickets without reference to their other remedial properties, if any, their particular chemical compositions, or their physical identities.

I do not limit myself to the particular chemicals, times, quantities, temperatures or steps of procedure given in the above examples, as these are noted simply as a means for clearly defining my invention.

What I claim is:—

1. In a process for the isolation of the antirachitic principles of cod liver oil, the steps which comprise treating cod liver oil with 95% alcohol separating the alcohol and the dissolved antirachitic principles from the oil, separating the acetone-soluble antirachitic principles from the alcohol and isolating the acetone-soluble antirachitic principles from the separate thus formed.

2. In a process for the extraction of the antirachitic principles of cod liver oil, the steps which comprise treating cod liver oil with 95% alcohol, saponifying the fatty acids in the alcoholic extract, precipitating the soaps thus formed and extracting the antirachitic principles from the precipitated soaps.

3. In a process for the extraction of the antirachitic principles of cod liver oil, the steps which comprise treating cod liver oil with alcohol, saponifying the fatty acids in the alcoholic extract, precipitating the calcium salts of soaps thus formed and extracting the antirachitic principles from the precipitated soaps.

4. In a process for the extraction of the antirachitic principles of cod liver oil, the steps which comprise treating cod liver oil with alcohol, saponifying the fatty acids in the alcoholic extract, precipitating the calcium salts of soaps thus formed and extracting the antirachitic principles from the precipitated soaps by means of acetone.

5. In a process for the extraction of the antirachitic principles of cod liver oil, the steps which comprise hydrolizing the cod liver oil with an alkali, extracting the soaps and antirachitic principles from the cod liver oil and separating the antirachitic principles from the soaps.

6. In a process for the extraction of the antirachitic principles of cod liver oil, the steps which comprise saponifying the fatty acids in cod liver oil with an alkali, extracting the mixture with ether and separating the antirachitic principles from the etherial extract.

7. In a process for the extraction of the antirachitic principles of cod liver oil, the steps which comprise saponifying the fatty acids in cod liver oil with an alkali, precipitating the soaps thus formed and separating the antirachitic principles from the soaps.

8. In a process for the extraction of the antirachitic principles of cod liver oil, the steps which comprise saponifying the fatty acids in cod liver oil, precipitating the calcium salts of the soaps thus formed and separating the antirachitic principles from the soaps.

9. The process of extracting the antirachitic principles from cod liver oil which comprises treating cod liver oil with alcohol, separating the alcoholic solution from the cod liver oil, saponifying the fatty acids in the alcoholic solution by means of sodium hydroxide, dissolving in water the soaps thus formed, precipitating the calcium soaps by means of calcium chloride, filtering the insoluble matters and extracting them with acetone, adding ether to the acetone solution, washing the ether solution with diluted alkali solution, then washing it with dilute hydrochloric acid, separating the ether solution, drying it and distilling it and recovering the antirachitic material remaining therefrom.

10. In a process for the isolation of the antirachitic principles of oil, the steps which comprise treating oil with 95% alcohol separating the alcohol and the dissolved antirachitic principles from the oil, separating the acetone-soluble antirachitic principles from the alcohol and isolating the acetone-soluble antirachitic principles from the separate thus formed.

11. In a process for the extraction of the antirachitic principles of oil, the steps which comprise treating oil with 95% alcohol, saponifying the fatty acids in the alcoholic extract, precipitating the soaps thus formed and extracting the antirachitic principles from the precipitated soaps.

12. In a process for the extraction of the antirachitic principles of oil, the steps which comprise treating oil with alcohol, saponifying the fatty acids in the alcoholic extract, precipitating the calcium salts of soaps thus formed and extracting the antirachitic principles from the precipitated soaps.

13. In a process for the extraction of the antirachitic principles of oil, the steps which comprise treating oil with alcohol, saponifying the fatty acids in the alcoholic extract, precipitating the calcium salts of soaps thus formed and extracting the antirachitic principles from the precipitated soaps by means of acetone.

14. In a process for the extraction of the antirachitic principles of oil, the steps which comprise hydrolyzing the oil with an alkali, extracting the soaps and antirachitic principles from the oil and separating the antirachitic principles from the soaps.

15. In a process for the extraction of the antirachitic principles of oil, the steps which comprise saponifying the fatty acids in oil with an alkali, extracting the mixture with ether and separating the antirachitic principles from the etherial extract.

16. In a process for the extraction of the antirachitic principles of oil, the steps which comprise saponifying the fatty acids of oil with an alkali, precipitating the soaps thus formed and separating the antirachitic principles from the soaps.

17. In a process for the extraction of the antirachitic principles of oil, the steps which comprise saponifying the fatty acids in oil, precipitating the calcium salts of the soaps thus formed and separating the antirachitic principles from the soaps.

18. In a process for the extraction of the antirachitic principles of oil, the steps which comprise saponifying the fatty acids in oil, precipitating the calcium salts of the soaps thus formed and separating the antirachitic principles from the soaps by means of acetone.

19. The process of extracting the antirachitic principles from oil which comprises treating oil with alcohol, separating the alcoholic solution from the oil, saponifying the fatty acids in the alcoholic solution by means of sodium hydroxide, dissolving in water the soaps thus formed, precipitating the calcium soaps by means of calcium chloride, filtering the insoluble matters and extracting them with acetone, adding ether to the acetone solution, washing the ether solution with diluted alkali solution, then washing it with dilute hydrochloric acid, separating the ether solution, drying it and distilling it and recovering the antirachitic material remaining therefrom.

Signed at New York city in the county of New York and State of New York this 6th day of December, 1922.

THEODORE F. ZUCKER.